US008016102B2

(12) United States Patent  
Morris

(10) Patent No.: US 8,016,102 B2  
(45) Date of Patent: Sep. 13, 2011

(54) CONVEYOR CHAIN FOR MINING MACHINERY

(75) Inventor: Randall Lee Morris, Cininnati, OH (US)

(73) Assignee: The Cincinnati Mine Machinery Company, Cincinnati, OH (US)

( * ) Notice: Subject to any disclaimer, the term of this patent is extended or adjusted under 35 U.S.C. 154(b) by 0 days.

(21) Appl. No.: 10/398,387

(22) PCT Filed: Oct. 9, 2001

(86) PCT No.: PCT/US01/31746
§ 371 (c)(1),
(2), (4) Date: Apr. 7, 2003

(87) PCT Pub. No.: WO02/28750
PCT Pub. Date: Apr. 11, 2002

(65) Prior Publication Data
US 2004/0140182 A1 Jul. 22, 2004

(51) Int. Cl.
*F16G 13/02* (2006.01)
*B65G 17/00* (2006.01)
(52) U.S. Cl. ............ 198/852; 198/731; 198/735.6; 198/698; 474/234
(58) Field of Classification Search .......... 198/735.6, 198/852, 731, 698; 474/234
See application file for complete search history.

(56) References Cited

U.S. PATENT DOCUMENTS

| | | |
|---|---|---|
| 1,028,893 A | 6/1912 | Luther |
| 1,694,275 A | 12/1928 | Clifford |
| 1,790,297 A | 1/1931 | Alger |
| 1,920,500 A | 8/1933 | Garcia |
| 2,068,666 A | 1/1937 | Dunlop |
| 2,091,836 A | 8/1937 | Haaff et al. |
| 2,297,813 A | 10/1942 | Stork |
| 2,391,485 A | 12/1945 | Simmons |

(Continued)

FOREIGN PATENT DOCUMENTS

DE 1166720 4/1964

(Continued)

OTHER PUBLICATIONS

"Product—Introduction—DA -3502-A, Our new chain offers great benefits for the mining industry", Mining Media International Journal (Aug. 28, 2009).

(Continued)

*Primary Examiner* — Mark A Deuble
(74) *Attorney, Agent, or Firm* — Wood, Herron & Evans, LLP

(57) ABSTRACT

A chain for a conveyor comprising an elongated base means (8, 9) having a bottom and upstanding side guides or flanges (11, 12) is provided. The chain is a continuous chain adapted to be driven so that one of its spans moves longitudinally along the upper surface of the base means bottom (10) and between side guides or flanges in a conveying direction so as to advance the material being conveyed. The chain comprises a plurality of Y-shaped connector links (20) and a plurality of flight arms connecting links (34) having arms attached thereto and normally extending substantially transversely of the conveying direction. Adjacent elements (41) are joined together by a series of bearing and retaining pins (30, 31) so as to permit vertical and horizontal articulation. The flight arms are attached to the flight arm connecting links (34) independently of the main bearing pins (30) that hold the various links of the chain together.

22 Claims, 10 Drawing Sheets

U.S. PATENT DOCUMENTS

| | | | |
|---|---|---|---|
| 2,398,107 A | 4/1946 | Morrow | |
| 2,569,584 A | 10/1951 | Shepherd | |
| 2,600,174 A | 6/1952 | William | |
| 2,613,546 A | 10/1952 | Jorgensen | |
| 2,672,971 A | 3/1954 | Joy | |
| 2,674,365 A | 4/1954 | Russell | |
| 2,756,867 A | 7/1956 | Russell et al. | |
| 2,756,868 A | 7/1956 | Russell | |
| 2,756,869 A * | 7/1956 | Merck et. al. | 198/731 |
| 2,922,511 A | 1/1960 | Ruppe | |
| 2,994,422 A | 8/1961 | Dalrymple | |
| 3,026,737 A | 3/1962 | Berg | |
| 3,086,404 A | 4/1963 | Krekeler | |
| 3,093,235 A | 6/1963 | Imse | |
| 3,103,275 A * | 9/1963 | Rollins | 198/733 |
| 3,155,225 A | 11/1964 | Krekeler | |
| 3,324,990 A | 6/1967 | Karlovsky, Jr. | |
| 3,463,026 A | 8/1969 | MacPherson et al. | |
| 3,584,734 A | 6/1971 | Bennett et al. | |
| 3,641,831 A * | 2/1972 | Palmaer | 474/234 |
| 3,646,752 A | 3/1972 | Kampfer | |
| 3,653,491 A | 4/1972 | Safko, Jr. et al. | |
| 3,679,265 A | 7/1972 | Krekeler | |
| 3,748,917 A | 7/1973 | Berg | |
| 3,762,535 A | 10/1973 | Mc Mullin et al. | |
| 3,841,707 A | 10/1974 | Kniff | |
| 3,888,133 A | 6/1975 | Krekeler et al. | |
| 3,952,860 A | 4/1976 | Specht | |
| 3,957,153 A | 5/1976 | Krekeler | |
| 3,961,702 A | 6/1976 | Blok | |
| 4,238,028 A | 12/1980 | Lake | |
| 4,265,084 A | 5/1981 | Livesay | |
| 4,339,031 A | 7/1982 | Densmore | |
| 4,441,605 A | 4/1984 | Ronco et al. | |
| 4,476,975 A | 10/1984 | Densmore | |
| 4,667,813 A | 5/1987 | Densmore | |
| 4,674,803 A | 6/1987 | Sterwerf | |
| 4,717,206 A | 1/1988 | Sterwerf | |
| 4,766,995 A * | 8/1988 | Sterwerf, Jr. | 198/733 |
| 4,773,528 A | 9/1988 | Anderson et al. | |
| 4,813,530 A | 3/1989 | Wechner | |
| 4,828,339 A | 5/1989 | Thomas et al. | |
| 4,856,384 A | 8/1989 | Wechner | |
| 4,865,184 A | 9/1989 | Wechner | |
| 4,865,185 A | 9/1989 | Bodimer | |
| 4,897,904 A | 2/1990 | Cowles | |
| 4,915,455 A | 4/1990 | O'Neill et al. | |
| 4,917,232 A | 4/1990 | Densmore | |
| 4,919,252 A | 4/1990 | Wechner | |
| 4,932,481 A | 6/1990 | Wechner | |
| 4,944,560 A | 7/1990 | Osterwise | |
| 4,947,535 A | 8/1990 | Cowles | |
| 5,000,310 A | 3/1991 | Edmondson | |
| 5,004,098 A | 4/1991 | Marshall | |
| 5,011,229 A | 4/1991 | O'Neill et al. | |
| 5,026,218 A | 6/1991 | Zimmerman | |
| 5,072,826 A | 12/1991 | Wechner | |
| 5,088,594 A | 2/1992 | Edmondson | |
| 5,088,797 A | 2/1992 | O'Neill | |
| 5,106,166 A | 4/1992 | O'Neill | |
| 5,156,256 A | 10/1992 | David | |
| 5,161,670 A | 11/1992 | David | |
| 5,163,545 A | 11/1992 | David | |
| 5,165,766 A * | 11/1992 | Thomas | 305/191 |
| 5,186,526 A * | 2/1993 | Pennington | 305/191 |
| 5,242,358 A | 9/1993 | Cowles | |
| 5,254,047 A | 10/1993 | Anderson | |
| 5,285,736 A | 2/1994 | Sturniolo | |
| 5,302,005 A | 4/1994 | O'Neill | |
| 5,348,130 A | 9/1994 | Thomas | |
| 5,404,997 A * | 4/1995 | Schreier et al. | 198/779 |
| 5,518,299 A | 5/1996 | Adamczyk et al. | |
| 5,597,393 A | 1/1997 | Johnson | |
| 5,692,807 A | 12/1997 | Zimmerman | |
| 5,725,283 A | 3/1998 | O'Neill | |
| 5,795,032 A | 8/1998 | Zimmerman | |
| 5,811,976 A | 9/1998 | Fischer | |
| 5,873,431 A | 2/1999 | Butler et al. | |
| 5,950,673 A | 9/1999 | Elliott-Moore | |
| 6,007,157 A | 12/1999 | Stewart | |
| 6,148,954 A | 11/2000 | Harris | |
| 6,161,684 A | 12/2000 | David | |
| 6,170,848 B1 | 1/2001 | Wechner | |
| 6,216,852 B1 | 4/2001 | David | |
| 6,224,164 B1 | 5/2001 | Hall et al. | |
| 6,302,623 B1 | 10/2001 | Nellson | |
| 6,325,460 B1 | 12/2001 | Frederick | |
| 6,364,148 B1 | 4/2002 | Neilson | |
| 6,386,640 B1 | 5/2002 | Neilson | |
| 6,401,914 B1 * | 6/2002 | Greve | 198/852 |
| 6,497,536 B1 | 12/2002 | Neilson | |
| 6,530,537 B2 | 3/2003 | Hanlon | |
| 6,565,162 B2 | 5/2003 | Stewart | |
| 6,571,936 B1 | 6/2003 | Melhuish | |
| 6,602,026 B1 | 8/2003 | Neilson | |
| 6,651,804 B2 | 11/2003 | Thomas | |
| 6,662,932 B1 | 12/2003 | O'Neill | |
| 6,729,464 B2 | 5/2004 | Thomas et al. | |
| 6,764,141 B2 | 7/2004 | O'Neill | |
| 6,796,388 B2 | 9/2004 | O'Meley | |
| 6,814,155 B1 | 11/2004 | Nielson et al. | |
| 6,890,037 B2 | 5/2005 | Stewart | |
| 7,005,576 B2 | 2/2006 | Niederriter | |
| 7,115,822 B1 | 10/2006 | Day et al. | |
| 7,201,062 B2 | 4/2007 | Hill | |
| 7,467,510 B2 | 12/2008 | Tout et al. | |
| 7,523,687 B2 | 4/2009 | Tout | |
| 7,607,866 B2 | 10/2009 | Eddowes et al. | |
| 2004/0140182 A1 | 7/2004 | Morris | |

FOREIGN PATENT DOCUMENTS

| | | |
|---|---|---|
| EP | 0618381 | 10/1994 |
| GB | 8688605 | 5/1961 |
| GB | 1054399 | 1/1967 |
| GB | 1537876 | 1/1979 |
| GB | 2215006 | 9/1989 |
| WO | WO0228750 | 4/2002 |

OTHER PUBLICATIONS

One-Page Drawing Page X9018H—Prior art chain.
The DA-450 Conveyor Chain internal memo dated Oct. 3, 2000 listing experiment dates.

* cited by examiner

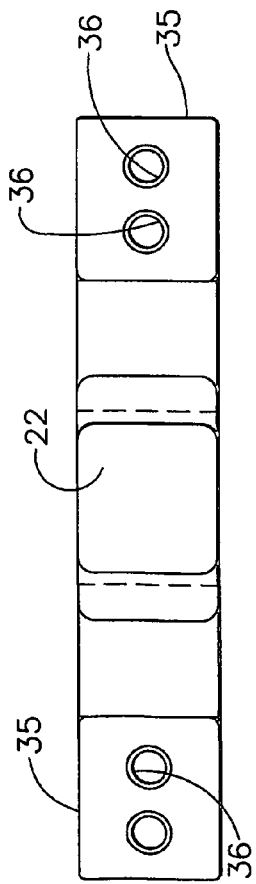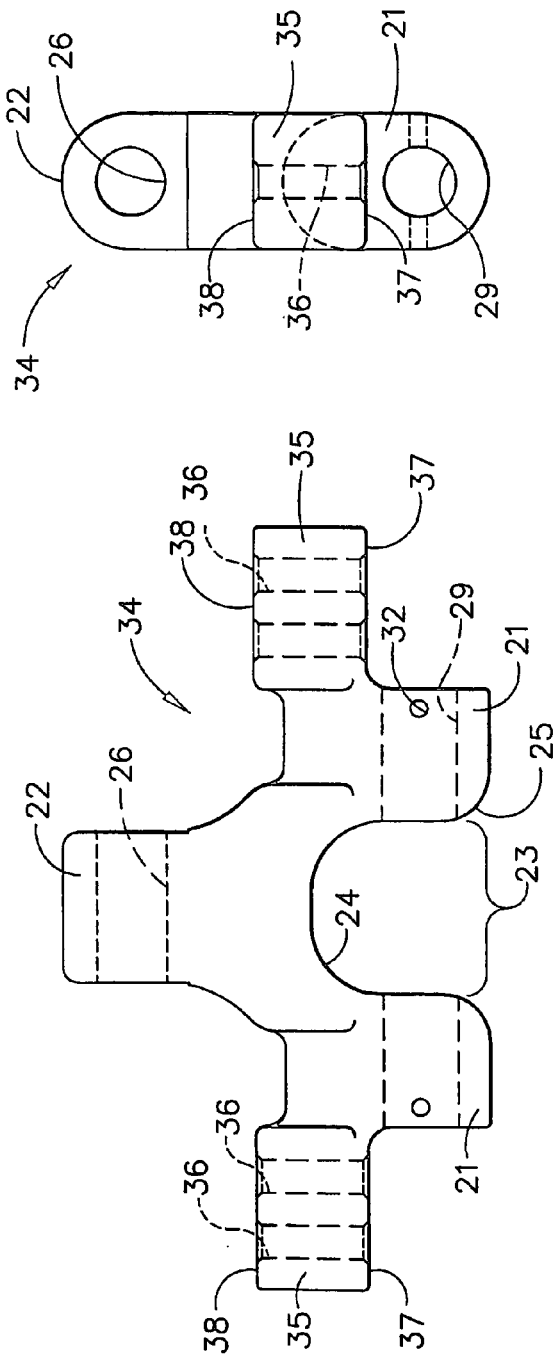
FIG. 5
FIG. 6
FIG. 4

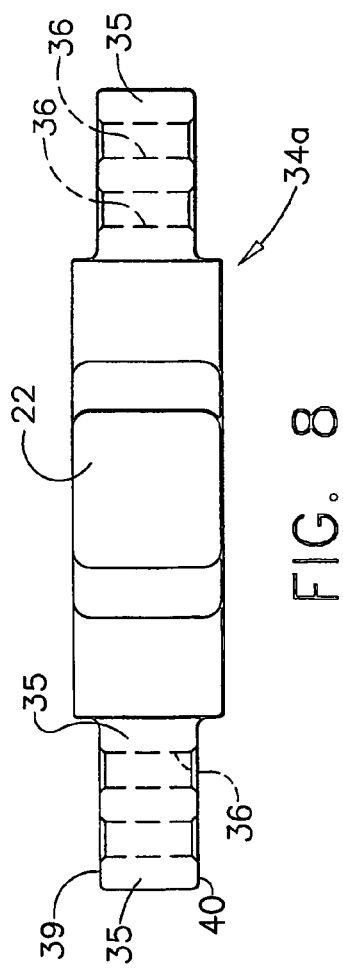
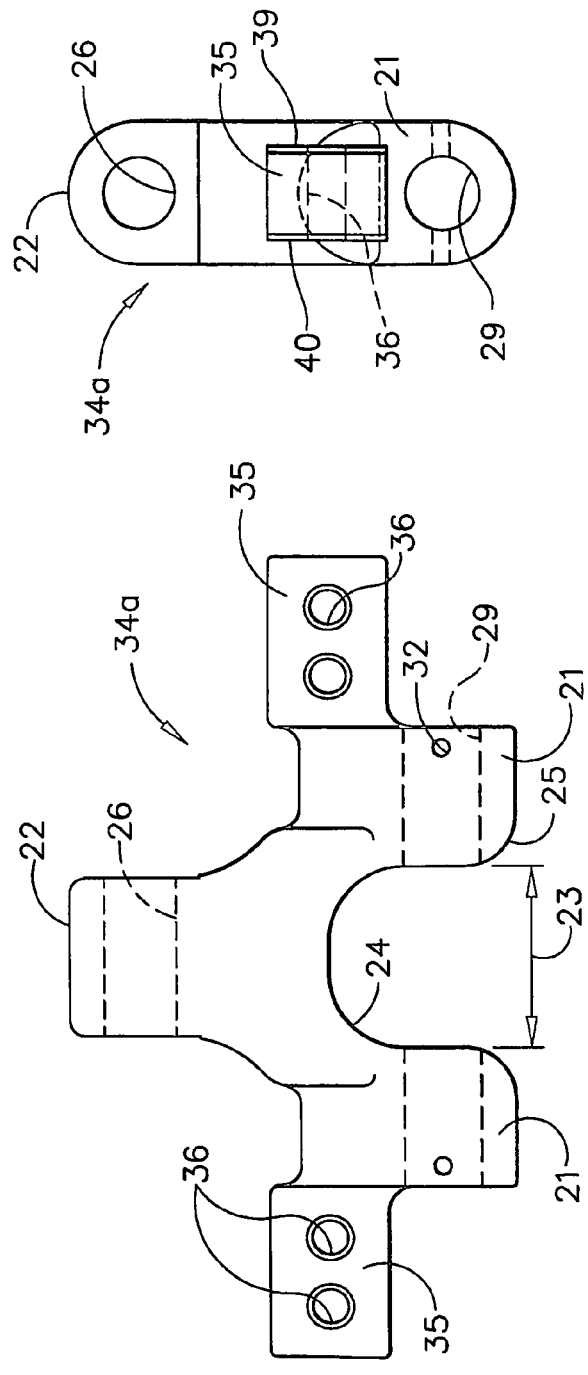

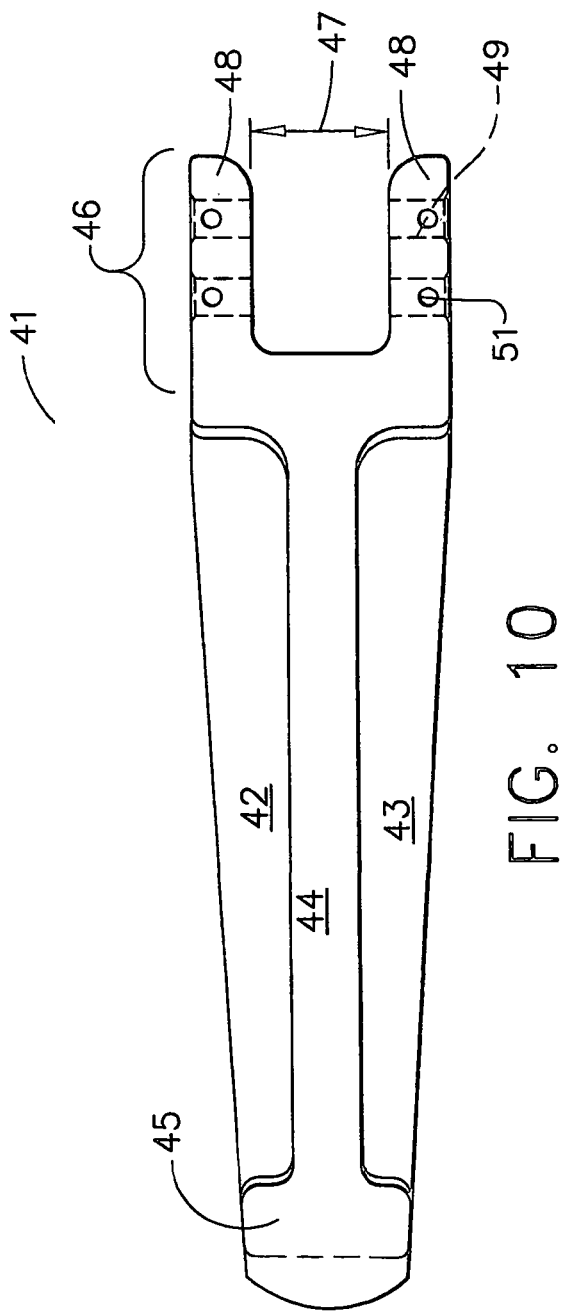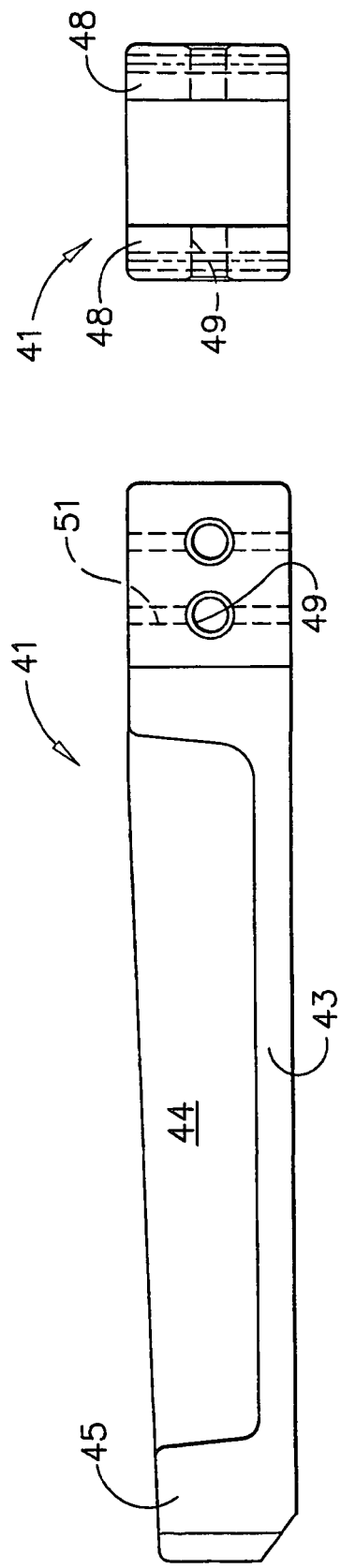

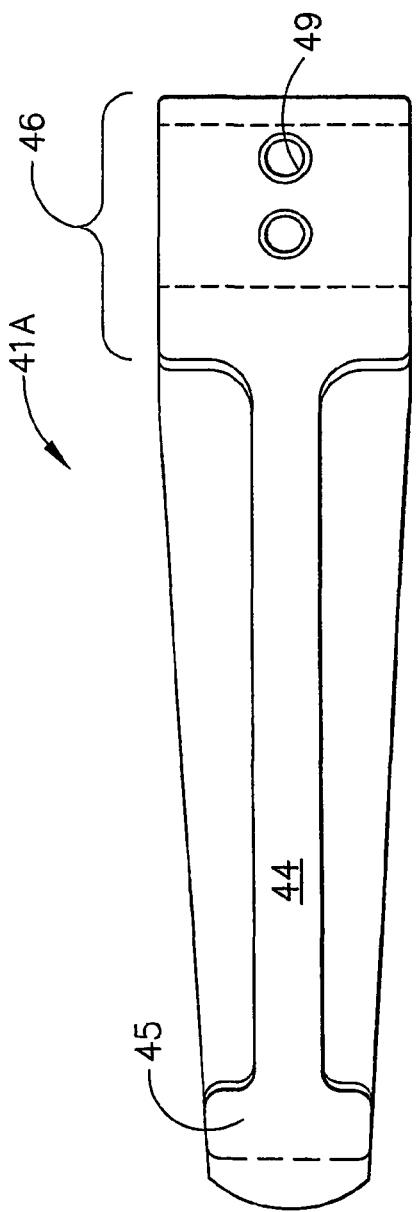
FIG. 13
FIG. 14
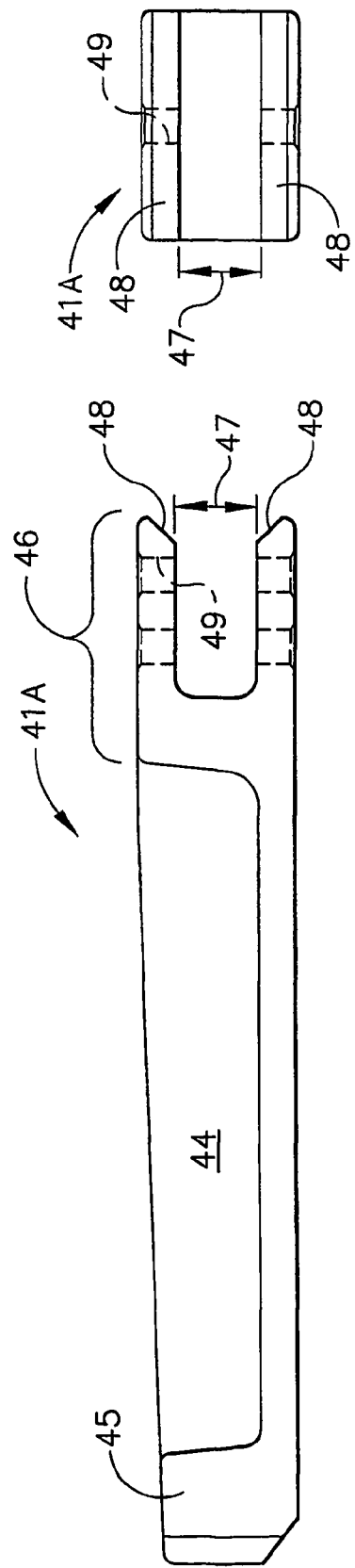
FIG. 15

CONVEYOR CHAIN FOR MINING MACHINERY

TECHNICAL FIELD

The present invention relates generally to conveyor chains, and, more particularly to mining machinery conveyor chain link bodies with attachments for flight arms.

BACKGROUND OF THE INVENTION

While conveyors with which the chain of the present invention are intended to be used may have many applications, for purposes of an exemplary showing, such conveyors will be described with respect to their use in the mining industry, although their use is not intended to be so limited.

Pusher-type chain conveyors, as used in the mining industry, are found both in the form of separate conveying units, and as integral parts of continuous mining machines. A typical continuous mining machine, for example, is self-propelled and is provided at its forward end with cutting means shiftable in such a way that an entry is cut in the material being mined. The entry is so sized as to permit the passage of the mining machine therethrough. Since the cutting operation is a continuous one, it is necessary to provide means to move the cut material from in front of the mining machine and to convey it out of the entry. To this end, the mining machine usually incorporates one or several conveyors in its construction, the conveyors acting successively to transport the cut material rearwardly of the machine. Frequently, the mining machine further incorporates a "tail conveyor" which is a part of the mining machine, located at its rearward end. The purpose of the tail conveyor is to deliver the cut material to other conveying means by which it is removed from the entry. The other conveying means may comprise mine cars, portable belt conveyors, or the like.

The most frequently encountered form of tail conveyor, in association with a continuous mining machine, comprises a section of conveyor base means mounted on the mining machine body. One or more additional sections of conveyor base means are connected thereto end-to-end, and extend beyond the rearward end of the mining machine body. All of the base means sections are characterized by a bottom portion provided with longitudinally extending, upstanding side guides or flanges. In order for the tail conveyor to perform its task properly, the various sections thereof must be capable of both lateral and vertical movement with respect to each other. This enables the cut material to be delivered to a desired point despite changes of position of the mining machine as it advances in the entry and changes in level of the entry floor. Similarly, this lateral and vertical movement capability of the conveyor sections enables the shifting of the desired delivery point for the material being mined, as required.

The tail conveyor typically incorporates a continuous pusher-type conveyor chain which is driven along the length of the conveyor base sections. The chain is normally provided with a plurality of rigid pusher elements, normally extending substantially transversely of the conveying direction. The pusher elements are located at spaced intervals along the chain. Adjacent pusher elements are joined together by a series of alternate block-like links and plate-like links. At one end of the machine's conveyor, the continuous chain passes over a driven sprocket. At the other end of the conveyor, the chain passes over a driven or idler sprocket, or roller.

Typically in the underground mining industry, machine downtime is very expensive. Should a conveyor chain fail (due to sudden impact or wear), the chain often would come apart during production causing several hours of expensive and unproductive downtime while the chain was repaired. Most often a conveyor chain fails from impact loads on the flight arms. These impacts over time cause a fracture which then causes the welded-in pins to fail.

BRIEF DESCRIPTION OF THE DRAWINGS

The accompanying drawings incorporated in and forming a part of the specification illustrates several aspects of the present invention, and together with the description and claims serves to explain the principles of the invention. In the accompanying drawings:

FIG. 4 is a top plan view of one embodiment of the flight arm chain connector link of the present invention;

FIG. 5 is a side elevational view of the flight arm chain connector link of FIG. 4;

FIG. 6 is an end view of the flight arm chain connector link of FIG. 4;

FIG. 7 is a top plan view of another embodiment of the flight arm chain connector link of the present invention;

FIG. 8 is a side elevational view of the flight arm chain connector link of FIG. 7;

FIG. 9 is an end view of the flight arm chain connector link of FIG. 7;

FIG. 10 is a top plan view of one embodiment of the flight arm of the present invention;

FIG. 11 is a side elevational view of the flight arm of FIG. 10;

FIG. 12 is an end view of the flight arm of FIG. 10;

FIG. 13 is a top plan view of another embodiment of the flight arm of the present invention;

FIG. 14 is a side elevational view of the flight arm of FIG. 13;

FIG. 15 is an end view of the flight arm of FIG. 13;

DETAILED DESCRIPTION OF THE INVENTION

Figure 1:
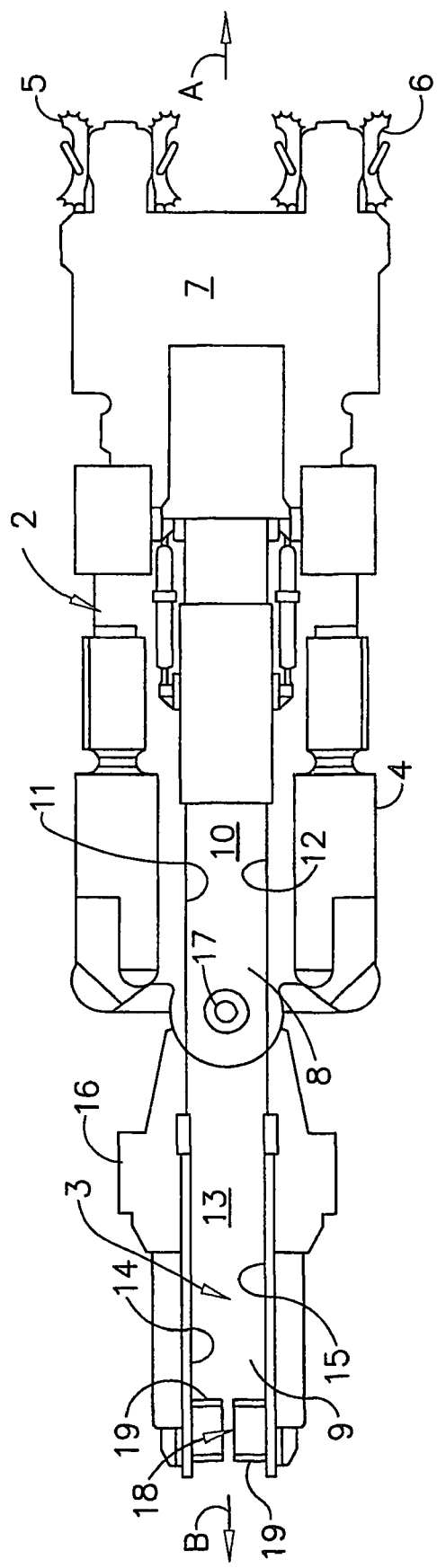
FIG. 1 is a semi-diagramatic plan view of a typical continuous mining machine having a tail conveyor utilizing a pusher-type conveyor chain.

For a better understanding of the invention, reference is first made to FIG. 1, illustrating an exemplary environment for the chains of the present invention. FIG. 1 diagrammatically illustrates a typical continuous mining machine generally indicated at 2 and provided with a tail conveyor, generally indicated at 3. The mining machine has a body portion 4 which is usually mounted on wheels or treads and is self-propelled. At the forward end of the mining machine, cutting means are provided as shown at 5 and 6. These cutting means 5 and 6 may take various well known forms and are mounted on means such as the frame 7, enabling the cutting means to be shifted in such a way that they will cut an entry large enough to receive and to permit advancement of the mining machine 2 in the cutting direction indicated by arrow A.

By various well known conveying means, the cut material at the forward end of the mining machine is gathered and transported over or through the mining machine to the tail conveyor 3. This last mentioned conveyor comprises a conveyor base means, illustrated in FIG. 1 as made up of two sections 8 and 9. The base means section 8 has a bottom portion 10 and upstanding side guide or flanges 11 and 12. Similarly, the section 9 has a bottom portion 13 and upstanding side guides or flanges 14 and 15. The section 9 is mounted on a boom 16 articulated to the rearward end of the mining machine body 4 as at 17. The articulation is such that the boom 16 and its conveyor base means section 9 are shiftable with respect to the conveyor base means section 8 both in the vertical plane and the horizontal plane for reasons explained above. A pusher-type conveyor chain, generally indicated at 18, extends along the length of the conveyor base means sections 8 and 9 and is adapted to be driven along the upper surface of their bottom portions 10 and 13. It will be understood that the chain 18 is a continuous chain. Normally it will be driven by a sprocket at at least one end of the tail conveyor 3.

As shown in FIG. 1, a typical chain 18 is provided with a plurality of spaced pusher elements 19, extending substantially transversely of the conveying direction indicated by arrow B. It will be seen that the pusher elements preferably extend to both sides of the chain 18 and that the pusher elements are located at predetermined intervals along the length of the chain.

Figure 3:
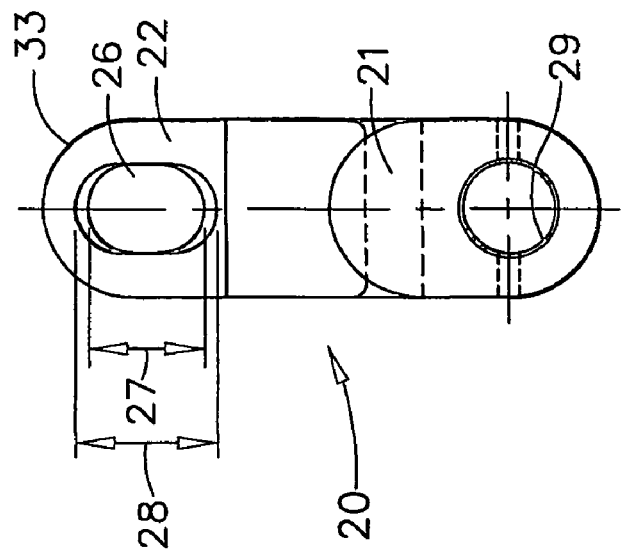
FIG. 3 is a side elevational view of the connector link of FIG. 2.
Figure 2:
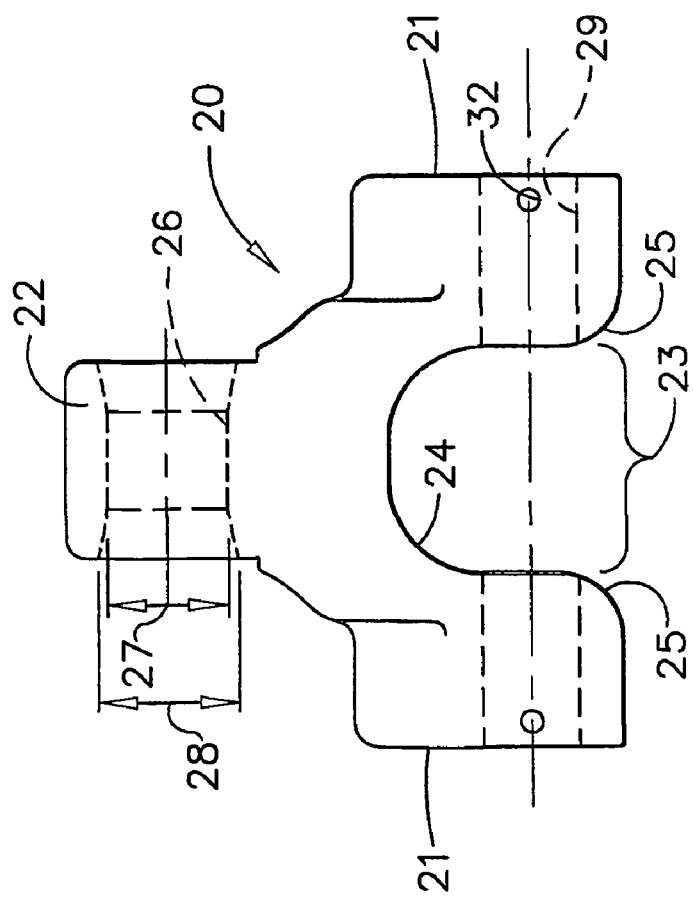
FIG. 2 is a top plan view of one embodiment of the preferred chain connector link of the present invention.

To assure a thorough understanding of the chains of the present invention, the individual parts used to make up the chains will be next described in detail. Reference is first made to FIGS. 2, 3 and 4 in which an exemplary chain connector link of the present invention is generally indicated at 20. In all of the figures, like parts have been given like index numerals.

As best shown in FIGS. 2 and 3, the improved conveyor chain of the present invention includes a plurality of generally "Y-shaped" chain connector links 20. Each chain connector link 20 preferably includes a pair of spaced forwardly extending arms 21 and a single rearwardly extending arm 22. A space 23 is provided between each pair of forwardly extending arms 21 that is adapted to receive a rearwardly extending arm 22 of an adjacent chain connector link 20. Preferably, as shown in FIG. 2, space 23 is partially defined by a portion 24 of the chain connector link 20 of substantially semi-circular or arcuate cross section. More preferably, each forwardly extending arm 21 includes a chamfered or rounded inner edge 25.

According to an important aspect of the present invention, each rearwardly extending arm 22 includes an elongated hole 26 disposed transversely therethrough. Preferably, as shown in FIGS. 2 and 3, the elongated hole 26 is preferably of oblong or elliptical cross-section. More preferably, the elongated hole 26 includes a center portion 27 of a lesser diameter than either end portion 28 of the elongated hole.

Figure 16:
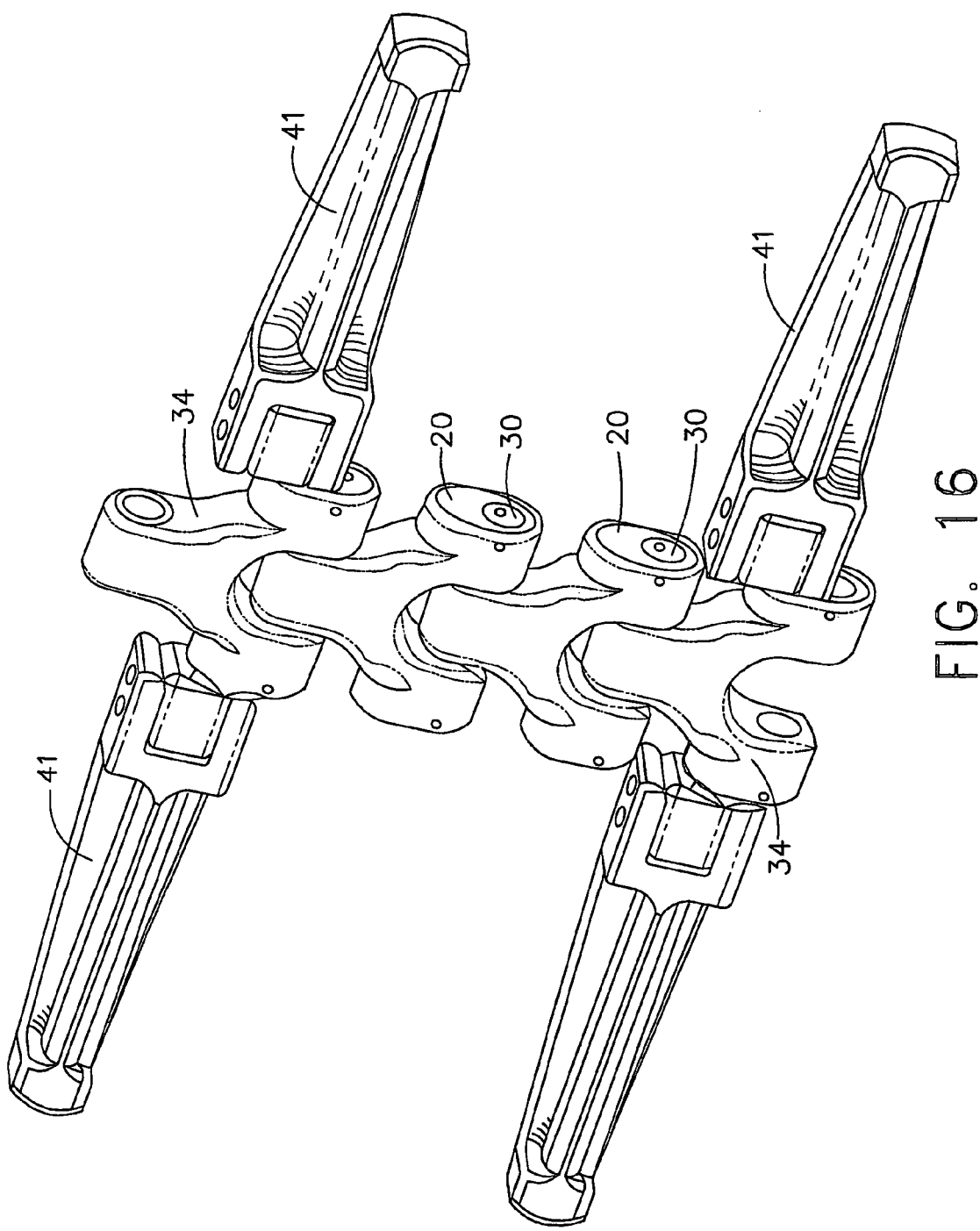
FIG. 16 is a perspective view of a segment of one embodiment of the improved conveyor chain of the present invention.

Each forwardly extending arm 21 includes a transverse opening 29 that is aligned with the transverse opening 29 on the corresponding forward arm 21. Preferably, the transverse openings 29 of the forward arms 21 are substantially of circular cross section. As best shown in FIG. 16, and in order to secure a pair of adjacent chain connector links 20 together, a bearing pin 30 is inserted through the transverse openings of the forward arms of one chain link body and through the rearwardly extending arm of another chain link body. The bearing pin is preferably held in place by one or more retaining pins 31 inserted in corresponding retaining pin holes 32 disposed in the forward arms 21 and the bearing pins 30.

As can best be seen in FIG. 2, each forwardly extending arm is at least partially of substantially elliptical cross section. Preferably, the distal end of the rearwardly extending arm includes a rounded end 33.

As best shown in FIGS. 4-6, the improved conveyor chain of the present invention includes a plurality of flight arm connector links 34. Each flight arm connector link 34, similar to each chain connector link 20, preferably includes a pair of spaced forwardly extending arms 21 and a single rearwardly extending arm 22. A space 23 is provided between each pair of forwardly extending arms 21 that is adapted to receive a rearwardly extending arm 22 of an adjacent flight arm chain connector link 34. Preferably, as shown in FIG. 4, space 23 is partially defined by a portion 24 of the flight arm chain connector link 34 of substantially semi-circular or arcuate cross section. More preferably, each forwardly extending arm 21 includes a chamfered or rounded inner edge 25.

Similar to the elongated holes 26 of the chain connector links 20, each rearwardly extending arm 22 of the flight arm connector links 34 also includes an elongated hole 26 disposed transversely therethrough. Preferably, as described previously, the elongated hole 26 is preferably of oblong or elliptical cross-section. More preferably, the elongated hole 26 includes a center portion 27 of a lesser diameter than either end portion 28 of the elongated hole. Optionally, and as shown in FIGS. 4 and 6, the elongated hole 26 may be substantially of circular cross-section.

Preferably, and as described previously, each forwardly extending arm 21 includes a transverse opening 29 that is aligned with the transverse opening 29 on the corresponding forward arm 21. Preferably, the transverse openings 29 of the forward arms 21 are substantially of circular cross section. As best shown in FIG. 16, and in order to secure a flight arm connector link 34 with an adjacent chain connector link 20 together, a bearing pin 30 is inserted through the transverse openings of the forward arms of one chain link body 20 and through the rearwardly extending arm of another chain link body 20 or flight arm connecting link 34. The bearing pin is preferably held in place by one or more retaining pins 31 inserted in corresponding retaining pin holes 32 disposed in the forward arms 21 and the bearing pins 30.

As best shown in FIGS. 4 and 5, each flight arm connector link 34 includes a pair of laterally extending flight arm attachment projections 35 adapted to receive a corresponding flight arm. Preferably, each laterally extending flight arm attachment projection 35 includes at least one, and preferably a pair of, flight arm securing holes 36. Preferably, the each securing hole 36 extends from a front face 37 of the flight arm attachment projection 35 to a rear face 38 thereof. As can be seen in FIG. 6, the widths of each flight arm attachment projection 35 is substantially identical to that of adjacent arms 21 and 22.

In an alternate embodiment of the flight arm connecting link 34a, and as best shown in FIGS. 7-9, the flight arm securing holes are disposed from a top surface 39 of a flight arm attachment projection 35 throughwardly to a bottom surface 40 thereof. In this embodiment, and as shown in FIG. 9, the flight arm attachment projections 35 are of a width less than adjacent arms 21 and 22.

Reference is made to FIGS. 10-12 wherein one embodiment of a flight arm 41 is shown. Preferably each flight arm includes an elongated body 42 having a flat, planar bottom surface 43. The body 42 has a central rib or web 44 acting as a pusher for the material being conveyed. The outer free end of the flight arm 41 is provided with a knob-like portion 45 which can ride against side guide elements 11, 12, 14 and 15 associated with conveyor sections 8 and 9. A chain link connecting portion 46 is provided with a recess 47 to facilitate attachment to a corresponding flight arm attachment projection 35 of a flight arm connecting link 34. The chain link connecting portion is provided with opposing prongs 48 having bearing holes 49 disposed therethrough. Bearing holes 49 are adapted to match up with corresponding flight arm securing holes 36 of a corresponding flight arm attachment projection 35 of a flight arm connector link 34. Bearing pins may be inserted through holes 36 and 49 to attach components 34 and 41 together. Bearing pins may be held in place by retaining pins disposed though retaining pin holes 51 and 32 of the flight arm 41 and flight arm connecting link 34 respectively. The embodiment of the flight arm 41 shown in FIGS. 10-12 is particularly adapted for use with the embodiment of the flight arm connecting link 34 of FIGS. 10-12.

Various other methods of flight arm attachments to the flight arm attachment link 34 are possible other than the bearing and retaining pin assemblies described. For example, the flight arm may be doweled, bolted, keyed or interlocked to a corresponding link various ways as known in the art. One advantageous feature of the above described designs of the present invention is the separation of the flight arms from the main bearing pin 30. The separation of the flight arms 41 from the main bearing pins 30, allows for better quality steels to be used without compromising the main bearing pins 30 toughness and fracture resistance in order to have good weldability (a requirement of prior art designs).

It should be appreciated that the various components may be comprised of essentially any suitable material known in the art that exhibits the requisite strength and durability characteristics. The various components are preferably steel and may be forged or are more preferably cast. Preferably the flight arms are comprised of spring steel. In order to reduce noise levels further during operation, composite steel and plastic or urethane components may be used.

A similar flight arm embodiment 41A with differently oriented bearing holes 49 and opposing prongs 48 is shown in FIGS. 13-15. Flight arm 41A is adapted for use with and connection to the embodiment 34A of the flight arm connecting link shown in FIGS. 7-9.

Figure 17:
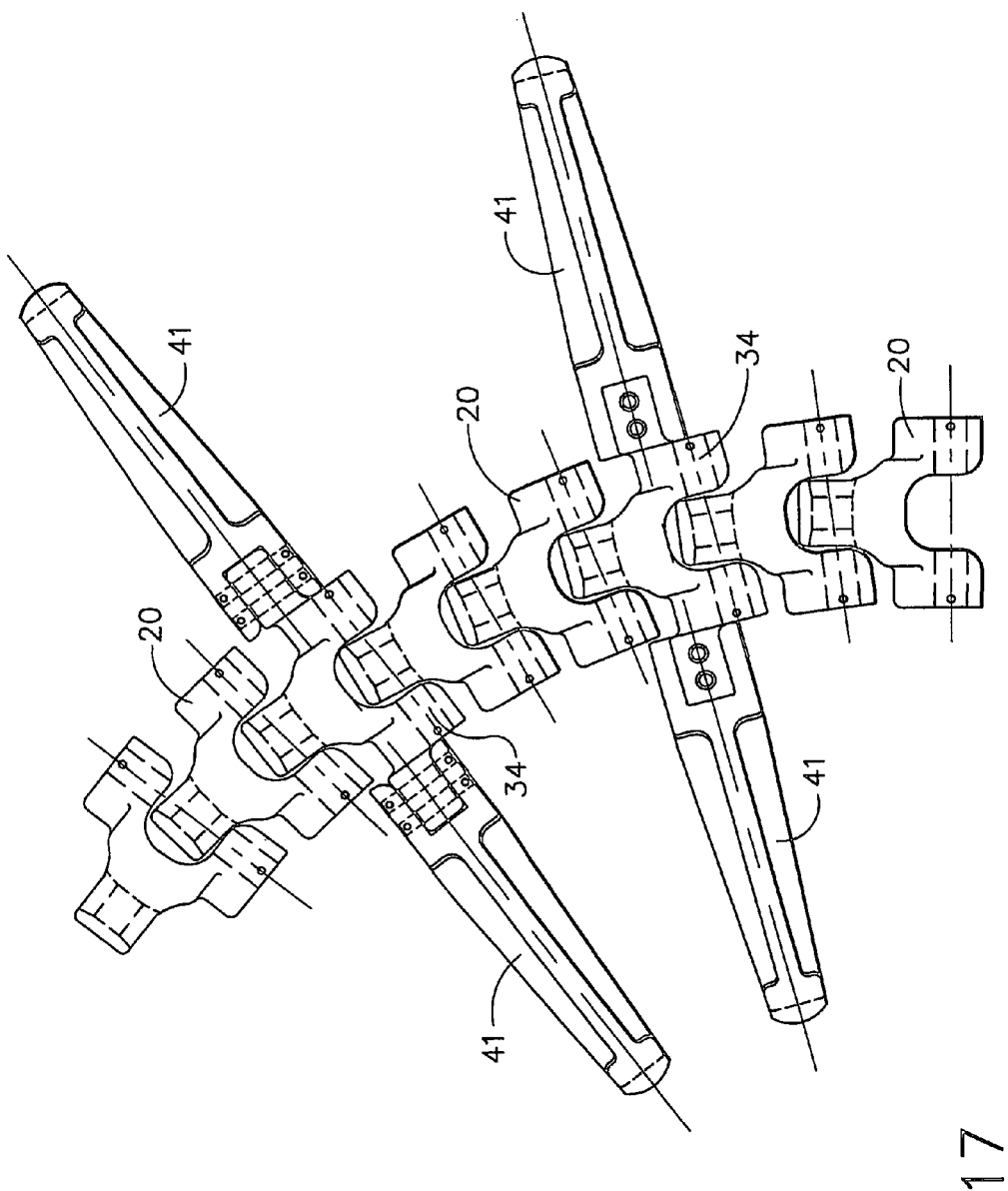
FIG. 17 is a top plan view of a segment of the improved conveyor chain of the present invention shown in a curved configuration.
Figure 18:
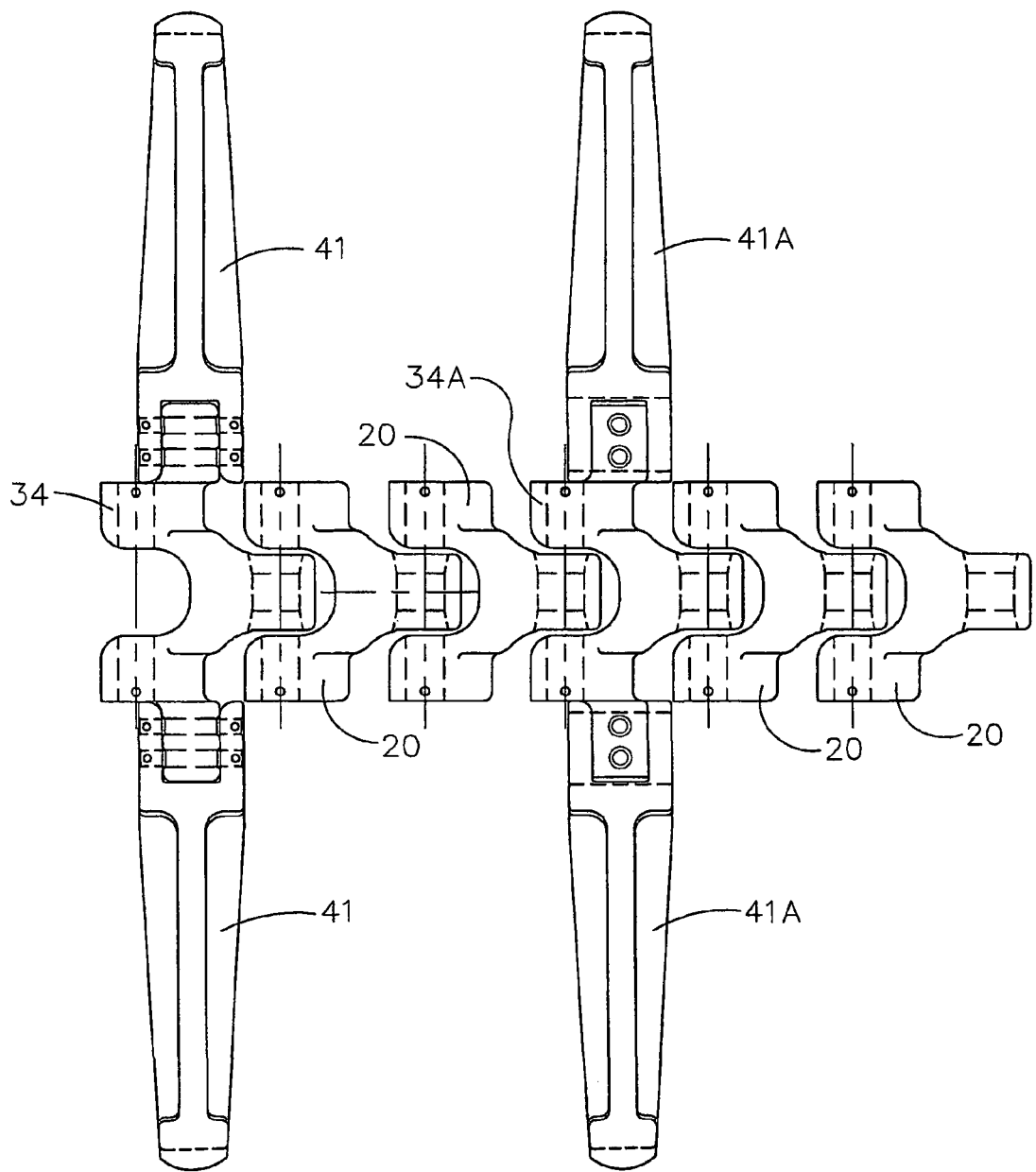
FIG. 18 is a perspective view of a segment of the improved conveyor chain of the present invention using both preferred embodiments of flight arm connector links and flight arms.

As can be seen in the FIGS. 16-18, the complete chain will be comprised of both "Y-shaped" chain connector links 20 and flight arm attachment links 34 or 34A with flight attachments 41 or 41A fixedly disposed thereon. Preferably each elongated hole 26 is adapted to "loosely" receive the bearing pin 30 so as to permit articulation and to allow, as a result, the conveyor chain of the present invention to navigate curves (See FIG. 17). It should be appreciated that the chain has the ability to negotiate curved conveyor sections by articulating via the elongated hole 26 through which the bearing pin 30 has freedom to "rotate" about the chain center and allow the chain the flexibility it needs to travel through the curved section. This offers a distinct advantage over known prior art chains which incorporate welded-in main bearing pins. The main bearing pin 30 preferably has an interference fit or may have a slight rotating fit in the transverse openings 29 of the forward arms 21 of the chain connector links 20. Depending upon its orientation in use, the links 20, 34, and 34A will preferably ride along the upper surfaces of the bottom portions 10 and 13 of conveyor sections 8 and 9 either on its surfaces 30 and 31 or its surfaces 33 and 34.

Figure 19:
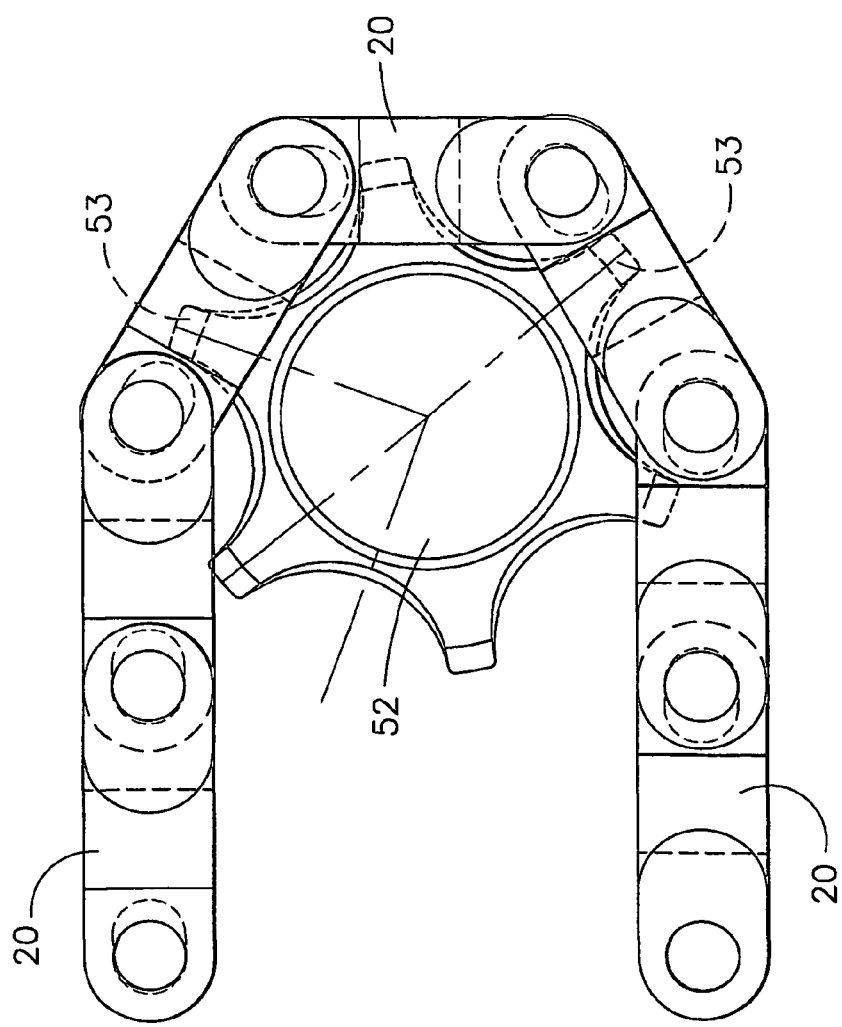
FIG. 19 is a side view of the preferred elongated sprocket of the present invention showing a segment of the improved conveyor chain of the present invention being driven thereon.

As can be seen in FIG. 19, the improved chain of the present invention is preferably driven by a six tooth dual sprocket 52. The chain is preferably designed with an offset in pitch from forward to reverse to allow for the chain to be seated in a corresponding sprocket root 53. Advantageously, this configuration allows for the chain to remain engaged longer on the sprocket and to be conveyed directly onto a loading deck. This configuration serves to minimize interference with loading devices and improves both sprocket and chain life. The dual six tooth sprocket also reduces the chains "striking energy" advantageously reducing chain drive noise.

The foregoing description of a preferred embodiment of the invention has been presented for the purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A conveyor chain comprising:
a plurality of chain links connected together in a chain, the chain links each including a pair of forward arms extending in a forward direction on both sides of the link and having a space therebetween and a rearward arm extending in a rearward direction;
the forward arms of one link configured to receive the rearward arm of an adjacent link in the space between the forward arms, the rearward arm of the adjacent link configured to couple with the forward arms of the one link and form a continuous chain;
the rearward arm of each link extending a distance from the forward arms so that when adjacent links are coupled together, an engagement space is created between the forward arms of the one link and the forward arms of the adjacent link on both sides of the links;
the engagement spaces configured to receive portions of sprockets that would engage the forward arms of the link on both sides of the chain for driving the chain.

2. The conveyor chain of claim 1 further comprising:
a flight arm link, the flight arm link including a pair of spaced apart forward arms extending in a forward direction on both side of the link and a rearward arm extending in a rearward direction;
the forward arms and rearward arm of the flight arm link configured to couple with a respective rearward arm and respective forward arms of adjacent links and form a continuous chain;
an attachment projection positioned on the flight arm link;
a flight arm configured for engaging the attachment projection to secure the flight arm to the flight arm link.

3. The conveyor chain of claim 2 wherein the attachment projection is positioned between where the front and rear arms of the flight arm link couple with adjacent links.

4. The conveyor chain of claim 1 wherein the forward arms of a link include transverse openings and the rearward arm of the link includes an elongated hole, the transverse openings of one link aligning with the elongated hole of an adjacent link to couple the links together.

5. The conveyor chain of claim 4 further including a bearing pin extending through the aligned transverse openings and elongated hole in order to couple the links together.

6. The conveyor chain of claim 5 wherein the elongated hole has an oblong cross-section so that it receives the bearing pin loosely in the rearward arm and allows articulation of the one link with respect to the adjacent link.

7. The conveyor chain of claim 4 wherein the elongated hole includes a center portion and an end portion, the center portion having a smaller dimension than the end portion.

8. The conveyor chain of claim 1 wherein the forward arms include rounded edges proximate the space therebetween.

9. The conveyor chain of claim 1 wherein a chain link includes an arcuate portion that defines the space between the forward arms.

10. The conveyor chain of claim 2 wherein the flight arm attachment projection includes securing holes and the flight arm includes bearing holes, the securing holes and bearing holes being aligned when the flight arm engages the attachment projection.

11. A conveyor system comprising:
A conveyor chain including a plurality of chain links connected together in a chain, the chain links each including a pair of forward arms extending in a forward direction on both sides of the link and having a space therebetween and a rearward arm extending in a rearward direction;
the forward arms of one link configured to receive the rearward arm of an adjacent link in the space between the forward arms, the rearward arm of the adjacent link configured to couple with the forward arms of the one link and form a continuous chain;
the rearward arm of each link extending a distance from the forward arms so that when adjacent links are coupled together, an engagement space is created between the forward arms of the one link and the forward arms of the adjacent link on both sides of the links; and
a drive device, the drive device including at least two sprockets with teeth, with one sprocket engaging the forward arms of the links on one side of the chain and another sprocket engaging the forward arms of the links on another side of the chain in respective engagement spaces so that the teeth of each sprocket engage the forward arms of the links to drive the chain.

12. The conveyor system of claim 11 wherein the forward arms of a link include transverse openings and the rearward arm of the link includes an elongated hole, the transverse openings of one link aligning with the elongated hole of an adjacent link to couple the links together.

13. The conveyor system of claim 12 further including a bearing pin extending through the aligned transverse openings and elongated hole in order to couple the links together.

14. The conveyor system of claim 13 wherein the elongated hole has an oblong cross-section so that it receives the bearing pin loosely in the rearward arm and allows articulation of the one link with respect to the adjacent link.

15. The conveyor system of claim 13 wherein the elongated hole includes a center portion and an end portion, the center portion having a smaller dimension than the end portion.

16. A conveyor chain comprising:
a plurality of chain link assemblies connected together in a chain, the chain link assemblies each coupled together so as to allow articulation between adjacent link assemblies so that the chain can travel in a curved path;
each of the link assemblies using a pin for coupling the link assembly with an adjacent link assembly for articulation, with each link assembly having a freedom to rotate about a chain center;
the pins of the link assemblies extending laterally beyond the chain center on either side of the chain center;
a sprocket engagement area formed on each side of the center of the chain proximate to where the pins laterally extend, the sprocket engagement area configured to receive part of a sprocket;
at least one flight arm link assembly in the plurality of link assemblies, the flight arm link assembly using a pin for coupling the flight arm link assembly with an adjacent link assembly;
a separate flight arm coupled to extend laterally from the flight arm link assembly, the flight arm having a connecting portion for connecting to the flight arm link assembly;
the separate flight arm coupled with the flight arm link assembly so that the connecting portion is maintained at a position that is laterally spaced from the chain center outside of the sprocket engagement areas of the link assemblies.

17. The conveyor chain of claim 16 further including a pair of separate flight arms with respective connecting portions, the separate flight arms each coupled with the flight arm link assembly so that the respective connecting portions are maintained at positions that are laterally spaced outside of where the sprockets engage the link assemblies.

18. The conveyor chain of claim 16 wherein the flight arm connecting portion includes a recess to couple the flight arm to extend laterally from the flight arm link assembly.

19. The conveyor chain of claim 18 wherein the flight arm connecting portion recess is configured to receive a portion of the flight arm link assembly therein to couple the flight arm to extend laterally from the flight arm link assembly.

20. The conveyor chain of claim 19 wherein the portion of the flight arm link assembly received by the connecting portion recess is an attachment projection spaced from the pins of the link assembly.

21. The conveyor chain of claim 18 wherein adjacent link assemblies share a common pin for coupling with each other.

22. A conveyor system comprising:
a conveyor chain including a plurality of chain link assemblies connected together in a chain, the chain link assemblies each coupled together so as to allow articulation between adjacent link assemblies so that the chain can travel in a curved path;
each of the link assemblies using a pin for coupling the link assembly with an adjacent link assembly for articulation, with each link assembly having a freedom to rotate about a chain center;
the pins of each link assemblies extending laterally beyond the chain center on either side of the chain center;
a sprocket engagement area formed in the link assemblies on each side of the center of the chain proximate to where the pins laterally extend, the sprocket engagement area configured to receive part of a sprocket;
at least one flight arm link assembly in the plurality of link assemblies, the flight arm link assembly using a pin for coupling the flight arm link assembly with an adjacent link assembly;
a separate flight arm coupled to extend laterally from the flight arm link assembly, the flight arm having a connecting portion for connecting to the flight arm link assembly;
the separate flight arm coupled with the flight arm link assembly so that the connecting portion is maintained at a position that is laterally spaced from the chain center outside of the engagement areas of the link assemblies; and
a drive device, the drive device including at least two sprockets, with one sprocket engaging the link assemblies at a sprocket engagement area on one side of the center of the chain and another sprocket engaging the link assemblies at a sprocket engagement area on another side of the center of the chain.

* * * * *

UNITED STATES PATENT AND TRADEMARK OFFICE
CERTIFICATE OF CORRECTION

| | | |
|---|---|---|
| PATENT NO. | : 8,016,102 B2 | Page 1 of 1 |
| APPLICATION NO. | : 10/398387 | |
| DATED | : September 13, 2011 | |
| INVENTOR(S) | : Randall Lee Morris | |

It is certified that error appears in the above-identified patent and that said Letters Patent is hereby corrected as shown below:

In the Specification

Column 2, lines 9-12 read "...drawings incorporated in and forming a part of the specification illustrates several aspects of the present invention, and together with the description and claims serves..." and should read --...drawings incorporated in and forming a part of the specification illustrate several aspects of the present invention, and together with the description and claims serve...--.

Column 4, lines 50-51 read "Preferably, the each securing hole 36..." and should read --...Preferably, each securing hole 36...--.

Column 4, lines 53-54 read "...the widths of each flight arm attachment projection 35 is..." and should read --...the width of each flight arm attachment projection 35 is...--.

In the Claims

Column 6, line 43, CLAIM 2 reads "...on both side of the link and..." and should read --...on both sides of the link and...--.

Signed and Sealed this
Twenty-eighth Day of October, 2014

Michelle K. Lee
*Deputy Director of the United States Patent and Trademark Office*